Figure 1:
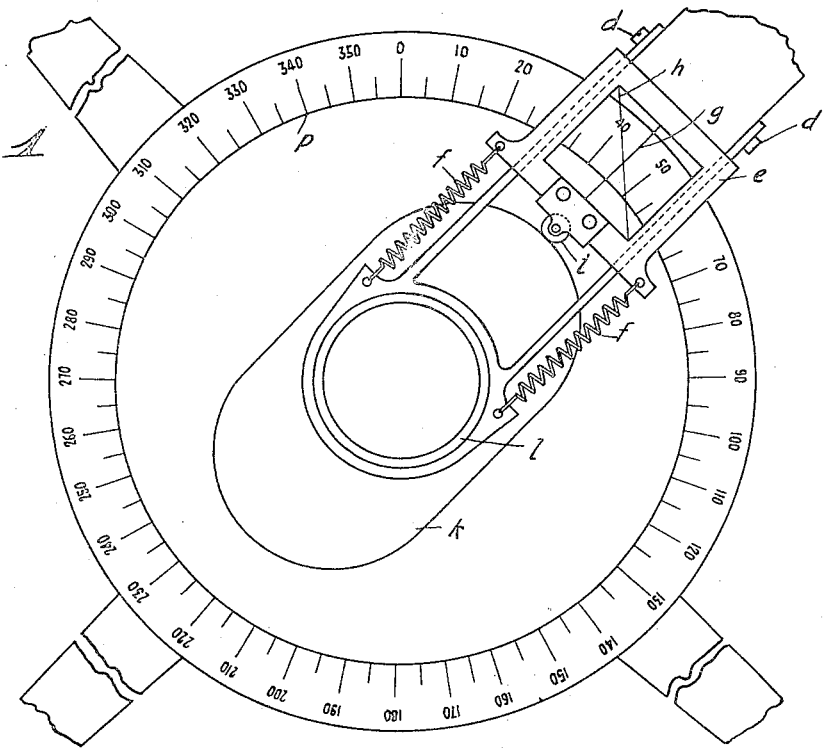

Oct. 31, 1933.  A. LEIB  1,932,627

METHOD OF MAKING CONTROL ELEMENTS FOR DIRECTION FINDER COMPENSATORS

Filed Oct. 29, 1929  2 Sheets-Sheet 1

INVENTOR
AUGUST LEIB
BY
ATTORNEY

Oct. 31, 1933.  A. LEIB  1,932,627
METHOD OF MAKING CONTROL ELEMENTS FOR DIRECTION FINDER COMPENSATORS
Filed Oct. 29, 1929.  2 Sheets-Sheet 2

INVENTOR
AUGUST LEIB
BY
ATTORNEY

Patented Oct. 31, 1933

1,932,627

UNITED STATES PATENT OFFICE 1,932,627

METHOD OF MAKING CONTROL ELEMENTS FOR DIRECTION FINDER COMPENSATORS

August Leib, Berlin, Germany, assignor to Telefunken Gesellschaft für Drahtlose Telegraphie, Berlin, Germany, a corporation of Germany Application October 29, 1929, Serial No. 403,340, and in Germany December 19, 1928

6 Claims. (Cl. 29—155.5)

United States application No. 379,608 filed July 20, 1929 discloses a new and improved method of determining the true pointing position of the signalling station as indicated by the pointer. The above mentioned application also discloses a means whereby the guide discs most adapted to the properties of the radio direction finder equipment in question for the reading device forming the main object of the said application can be made with a maximum degree of accuracy. This method consists in that a plate from which the guide curve is to be cut is secured on the direction-finder circle, that the reading pointer, at various angles of rotation of the direction-finder wheel, is drawn off to the corresponding true reading and is marked by a suitable, most preferably pointed marker device by application of pressure on the contour of a roller upon the plate to be worked so that thereby the contour of the guide disc to be made is determined, said marking device being introduced through the journal of the roller which is later to cooperate with the guiding curve in the finished apparatus, and taking meanwhile the place of the said roller.

Now, it has been found that this method does not yet insure sufficient accuracy of the guiding disc thus obtained. For when from the plate upon which the tracks of the marking device indicate the desired contour, the desired guide disk is cut out along the enveloping of this family of curves, it is impossible to prevent slight irregularities amounting to fractions of one millimeter or small bending of the cutting edges. But it has been found, on the other hand, that even slight errors in the shape of the edges of the guide discs are liable to result in appreciable reading or bearing errors. Also reaming or file-finishing of the curved disc which is first made somewhat larger than it should be, fails to give satisfactory results since such finishing work is possible only when the cutting plate has been demounted so that simultaneous checking-up of the proper work is impossible.

The present invention relates to another improvement of the method disclosed in said other application. This improvement resides in that the plate, worked by the aid of the method of the other application and the marking device therein disclosed, to result in a curved disc is first taken off from the bearing disc and is so cut out by scissors along the enveloping of the family of contours marked by the marking or pricking device that there remains everywhere a free margin which is later to be removed. In order that the superfluous material of the latter may be removed with great accuracy, the curve disc cut out in accordance with the method hereinbefore described is replaced on the bearing disc into its previous position, while instead of the pricking device a miller is inserted whose milling wheel has the same diameter as the guide roller sliding over the curve disc in the completed instrument. Since the guide disc is everywhere proportioned too liberally or amply, the reading hand will not be in the previously known accurate position for every position of the bearing wheel. Now, the milling wheel is turned at as great a number of positions as possible of the bearing wheel (differing from each other by, say, five degrees) until the reading hand or pointer each time occupies the proper position. Then the guide disc can be demounted and the other points can be reamed off.

Figure 2:
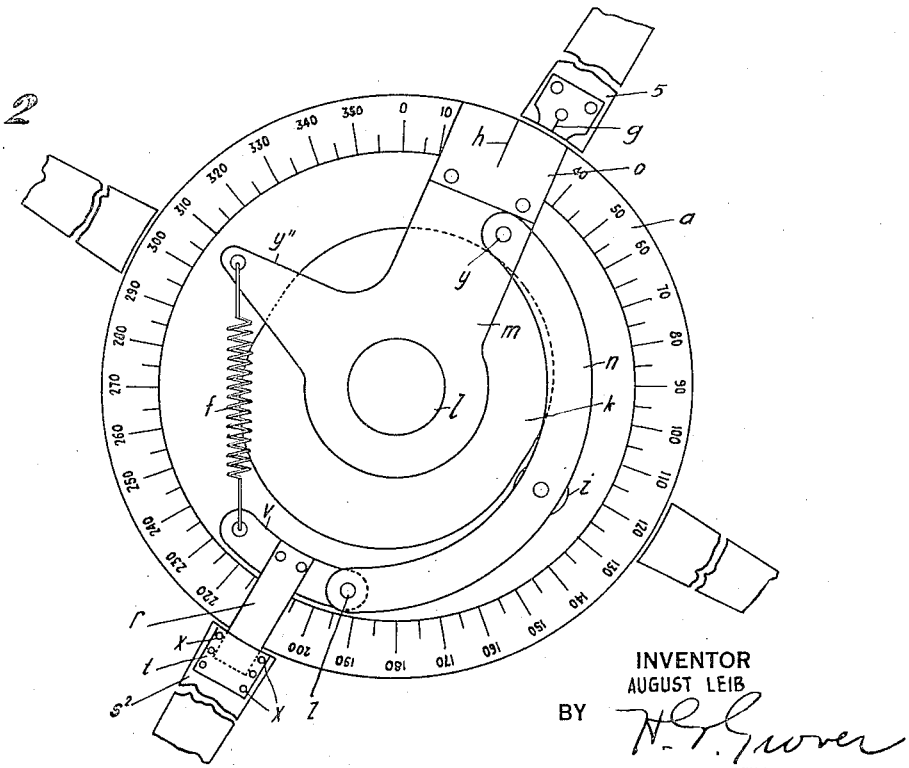

A more complete understanding of the invention will be had from the specification when read with the accompanying drawings in which Figures 1 and 2 serve to illustrate two forms of apparatus for carrying out applicant's novel method of forming compensating guides for direction finder apparatus, while Figures 3 to 8 inclusive show the several steps in the development of a cam in accordance with the present invention.

As disclosed in the above referred to United States application, a guide accurate enough for some purposes may be formed by use of the apparatus shown in the annexed drawings. In producing the guide as described in the above referred to United States application, and in accordance with the present invention, any direction finder which includes a mechanical compensator may be used. In particular, direction finders having mechanical compensators, as illustrated in Figures 1 and 2 of the drawings, are adapted to lend themselves admirably to the production of guide cams in accordance with this invention.

Figure 3:
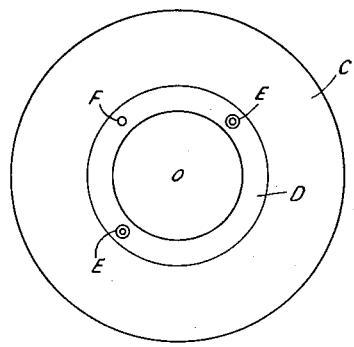

In Figure 1 a direction finder absorption member is adapted to be fixed for rotation with a shaft $l$, which is in turn adapted to be rotated by a hand wheel, the spokes of which are shown in the drawings. To one spoke of the hand wheel is fastened guide member $d$, on which a slide $e$ is mounted. The slide $e$ carries on its inner edge a roller $i$ adapted to bear against the periphery of a cam $k$ fixed with respect to the absorption member, the shaft, and the hand wheel. A pair of springs $f$ insure that the guide $e$ is maintained in its inner-most position at all times. The absorption member, shaft, hand wheel, etc., of the modification shown in Figure 2 are the same as the corresponding elements of Figure 1. However, in Figure 2 compensation is effected by means of an oscillating member $m$ spring biased by a spring $f$ connected to an arm $y''$. A lever member $n$ is fixed at $z$ for rotation with the hand wheel, and at the other end is fixed at $y$ to the member $m$. A roller $i$ intermediate ends of the lever $n$ is adapted to bear on the periphery of cam $k$. The pivot $z$ is fixed to a member $v$, which is in turn fixed to a member $r$ clamped by a member $t$ and bolts or rivets $x$ to one spoke of the hand wheel. As the absorption member and shaft $l$ are rotated by means of the hand wheel the member $n$ oscillates several degrees about a fixed point $g$. In both modifications the index $g$ indicates the apparent position of the signalling source, while the index $h$ indicates the true position of the signalling source. In forming this guide it is sufficient to replace the roller $i$ by a convenient marking device, and to dispose at the place where later the disc or cam $k$ is to be arranged, a plate or slab C, see Figure 3, from which the disc or cam $k$ is to be cut later. The manner in which the blank C is mounted on the shaft in place of the cam member $k$ will be more clearly understood by referring to Figure 3 in which C indicates the blank or sheet preferably of metal, from which the guide curve is to be cut out. The blank C may have any known contour or boundary and may be circular, as shown in Figure 3, providing it has sufficient area to include the largest radius indicated by $a$ in Fig. 4. O indicates the central opening in the blank C which is placed over the operating shaft of the direction finder. D indicates reenforcing rings riveted together on opposite sides of C. The rings and blank may be fastened by means of bolts not shown, which may be passed through the openings E or D, which openings correspond with the openings supporting cam $k$. F is a second opening in D through which a bolt may be passed thereby insuring that the proper face of member C is exposed when it is placed in the position later to be taken by the cam member $k$. If, then, in the presence of different angles of the bearing wheel the index $h$ with its crank $m$, Fig. 2, is drawn off in the position corresponding to the reading of the true bearing angle, and if the marking device located in the place of the roller $i$ is pressed down, by applying pressure from above, upon the plate to be worked or shaped, an outline will be produced or scratched upon the latter as indicated at $a$ of Figure 4 by the sharp contour of the marking device, and several such marking contours outline the shape of the requisite guide cam K. Similarly a corresponding procedure as mentioned above can be followed for making cams on the compensating device shown in Fig. 1. The manner in which the outline is marked on the blank C will be understood by referring to Figure 4 in which are shown a plurality of circles marked thereon by means of a scriber or marking tool. The inner envelopes of these circles determine the required edge of the guide disc in its finished form. This form is indicated by the line $a$ in Figs. 4 and 5.

Figure 4:
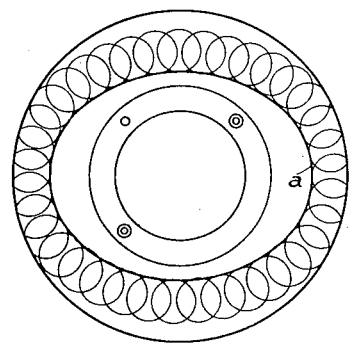
Figure 5:
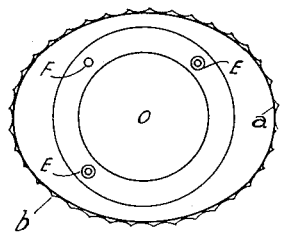
Figure 6:
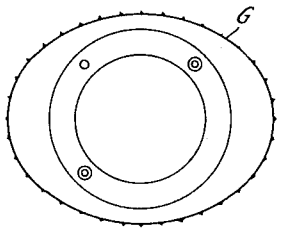
Figure 7:
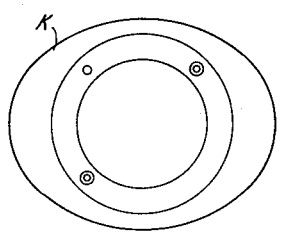
Figure 8:
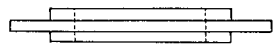

As pointed out above in some instances a greater degree of accuracy is required and therefore a compensating guide which provides greater accuracy is necessary. Such a guide may be formed in accordance with the present invention by marking a plate in accordance with the method pointed out above as illustrated in Figure 4 and in the prior referred to specification, removing the plate C from the support for the bearing disc $k$ and cutting off the surplus material by means of a scissors along the envelope of a series of contours by the marking or pricking device which in the first step of the method is carried in place of the roller $i$. The manner in which the excess portion, that is, the portion outside of the guide line $a$, may be removed by rough cutters, or scissors, is indicated in Figure 5 in which the disc is shown as having substantially all of the material between the original periphery of the member C and line $a$ removed. The blank now has a contour roughly similar to the contour which the finished cam $k$ will have. This contour is indicated by the rough line B. In order that the extra material of the disc may be removed with greater accuracy and in accordance with the present invention the disc is replaced in its previous position, while instead of the marking device a miller not shown having the same diameter as the guide roller $i$ is inserted in place of the roller $i$. The milling wheel which is rotated at a high rate of speed is turned about the axis $l$ to a great number of different positions of the bearing wheel as for instance, every five degrees and the periphery of the guide disc milled down until the reading line $h$ in each angular position occupies the proper position. After the cam has been milled, as outlined above, its outer periphery will be as indicated in Figure 6. The contour of the cam will approach its finished shape but will have on its periphery a plurality of rough spots, indicated at G, left by the miller. The guide disc can now be removed and the rest of the periphery therefore reamed off even with the portions milled off as hereinbefore described. Figure 7 shows the finished cam having a smooth contour K, while a side view of the finished cam is shown at Figure 8.

Having now described my invention what I claim is:

1. The method of producing guide discs for radio direction finder compensating mechanisms which consists in marking a disc in accordance with the true pointing directions, roughly removing the surplus material from said disc, reducing portions of the periphery of said disc to the exact bearing line, and removing the remaining surplus material from said disc.

2. The method of making guide discs for radio direction finders including the steps of producing a blank roughly of the shape of the desired guide disc, fastening said blank to the direction finder on which it is to be used, taking a plurality of readings on said direction finder and marking on said blank indications, the radial position of which on said blank are representative of the reading error of the direction finder in that angular position, and removing the portions of said blank outside of said markings.

3. The method of making guide discs for radio direction finders including the steps of producing a blank roughly of the shape of the desired guide disc, fastening said blank to the direction finder on which it is to be used, taking a plurality of readings on said directon finder and marking on said blank indications, the radial position of which on said blank are representative of the reading error of the direction finder in that angular position, removing said blank from said direction finder, and removing the excess portions of said blank outside of said markings.

4. The method of making guide discs for radio direction finders including the steps of producing a blank roughly of the shape of the desired guide disc, fastening said blank on the axis of the absorption member of the direction finder on which it is to be used, taking a plurality of readings on said direction finder, marking on said blank indications, the radial position of which are representative of the reading error of the direction finder absorption member in that angular position, removing the blank, roughly removing the excess portions of said blank outside of said markings, replacing said blank on said direction finder and removing accurately any residue of material left outside of said markings after the prior operation.

5. The method of making guide cams to be used on direction finders which include compensating means interposed between the rotatable signal absorption member and the position indicator for imparting to the latter movement relative to the absorption member representative of the inherent errors in said direction finder which includes the steps of providing a blank roughly similar in shape to the shape of the desired finished cam, fastening said blank with reference to said absorption member, taking readings on said direction finder and marking on said blank a series of angularly displaced indications, the radial positions of which are representative of the pointing error of the absorption member in that angular position, removing said blank, cutting said excess material between the periphery of said blank and said markings by means of a rough cutter, replacing said blank in its first position, removing more of said material by means of a cutting tool to be mounted on said direction finder, removing said blank from said direction finder and removing the remainder of the excess material from said blank.

6. The method of making compensating cams for radio direction finders including the steps of producing a blank roughly of the shape of the desired cam, fastening said blank to the direction finder on which the said cam is to be used, taking a plurality of readings on said direction finder and marking on said blank indications, the radial position of which on said blank are representative of the reading error of the direction finder in that angular position, and removing said cam from the direction finder to remove the portions of said blank outside said markings and again replacing said cam on said direction finder to obtain the finished contour of said cam with a milling cutter, and revolving said cutter until the finished contour is obtained.

AUGUST LEIB.